United States Patent

[11] 3,628,129

[72] Inventor John E. Riley
Saugus, Mass.
[21] Appl. No. 77,253
[22] Filed Oct. 1, 1970
[45] Patented Dec. 14, 1971
[73] Assignee General Electric Company

[54] PROCESS CONTROLLER INCLUDING A RATE CIRCUIT RESPONSIVE SOLELY TO PROCESS VARIABLE SIGNAL CHANGES
5 Claims, 2 Drawing Figs.

[52] U.S. Cl. .................................................. 323/100,
318/678, 330/30 D, 330/69, 330/107, 328/69
[51] Int. Cl. ...................................................... H02p 13/16,
H02m 3/04, H02m 5/04
[50] Field of Search ............................................ 318/678;
236/46; 330/30 D, 69, 98, 107; 328/69; 323/100,
22 T, 22 SC

[56] References Cited
UNITED STATES PATENTS

| | | | |
|---|---|---|---|
| 3,377,548 | 4/1968 | Newbold ...................... | 323/100 |
| 3,441,836 | 4/1969 | Riley ............................ | 323/100 |
| 3,470,457 | 9/1969 | Howlett ....................... | 323/22 T |
| 3,530,389 | 9/1970 | Gormley et al. ............. | 330/69 X |

*Primary Examiner*—Gerald Goldberg
*Attorneys*—William S. Wolfe, Gerald R. Woods, Frank L. Neuhauser, Oscar B. Waddell and Joseph B. Forman ABSTRACT: An improved process controller wherein rate action occurs only during changes in the process variable signal. The process variable signal is applied to one input terminal of a first differential amplifier having a rate circuit connected in a feedback loop between the output terminal and the second input terminal of the amplifier. The first differential amplifier provides one input to a second differential amplifier, a second input to which is provided by a setpoint signal source. Proportional and reset action may be applied to the output signal of the second differential amplifier.

INVENTOR:
JOHN E. RILEY,

BY Gerald R Woods
HIS ATTORNEY.

3,628,129

PROCESS CONTROLLER INCLUDING A RATE CIRCUIT RESPONSIVE SOLELY TO PROCESS VARIABLE SIGNAL CHANGES

BACKGROUND OF THE INVENTION

The present invention relates to process control systems and, more particularly, to a process controller wherein rate action occurs only during changes in a process variable signal.

In a closed-loop process control system, one or more parameters or variables in the process are monitored by transducers which generate electrical signals. These signals, hereafter referred to as process variable signals, are proportional to existing values of the monitored variables. The process variable signals similarly proportional to a desired value for the particular variable. If a deviation or error exists between the process variable signal and the setpoint signal, the controller generates a signal which is applied to an element such as an electrical to mechanical transducer. The element adjusts the operating level or position of a process controlling device such as a value and, consequently, the operating level of the process itself to drive the variable toward its setpoint.

The signal generated by the controller is normally not equal to the deviation between the setpoint signal and the process variable signal, but differs from the deviation according to the type of controller. If the controller includes proportional action, the controller output is amplified relative to the deviation signal. If the controller includes reset circuitry, the controller output is continually adjusted in accordance with the integral of the deviation between the process variable and the setpoint signals. The reset action continues so long as any deviation exists. If the controller includes rate circuitry, the output of the controller is normally a partial function of the rate of change or derivative of the deviation.

Since changes either in the process variable or in the setpoint in a typical controller give rise to a deviation between the two, rate action occurs regardless of which of the two inputs were changing. In typical systems, a small setpoint change could result in a process-affecting controller signal having a magnitude equal to the rate gain times the magnitude of variation in the setpoint. In a typical system, rate gain is on the order of 10. Consequently, the controller output will change by an amount 10 times as great as the setpoint change. When circuit parameters are chosen in the controller amplifier to produce long-time constants, the application of rate action to setpoint changes can result in initially high and long-lasting controller signals which cause overshoot of the process. Overshoot often disrupts a process with consequent loss of production time and product quality.

To eliminate the disruptive effects caused by applying rate action to changes in setpoint, circuits have been invented wherein rate action is applied solely to the process variable input. One such circuit is disclosed and claimed in U.S. Pat. No. 3,441,836, assigned to the assignee of the present invention. While the circuit shown in the referenced patent meets the desired objective of applying rate action only to a process variable input, it is desired to simplify the circuit.

SUMMARY OF THE INVENTION

The present invention is an improved process controller which includes an amplifier having an input which is adapted to be connected to a process variable signal source, and an output. A rate circuit is connected electrically in a feedback loop between the output terminal and the input of this amplifier. The controller includes a signal-combining means having a first input terminal connected to the output of the amplifier, a second input terminal adapted to be connected to a setpoint signal source, and an output terminal. The signal on the output terminal of the signal-combining means is characterized by the fact that the rate action is applied only to changes in the process variable signal applied to the amplifier.

DESCRIPTION OF THE DRAWINGS

While the specification concludes with claims particularly pointing out and distinctly claiming that which is regarded as the present invention, certain details of a preferred embodiment of the invention along with further objects and advantages may be more readily ascertained from the following detailed description when read in conjunction with the accompanying drawings in which:

DETAILED DESCRIPTION

Figure 1:
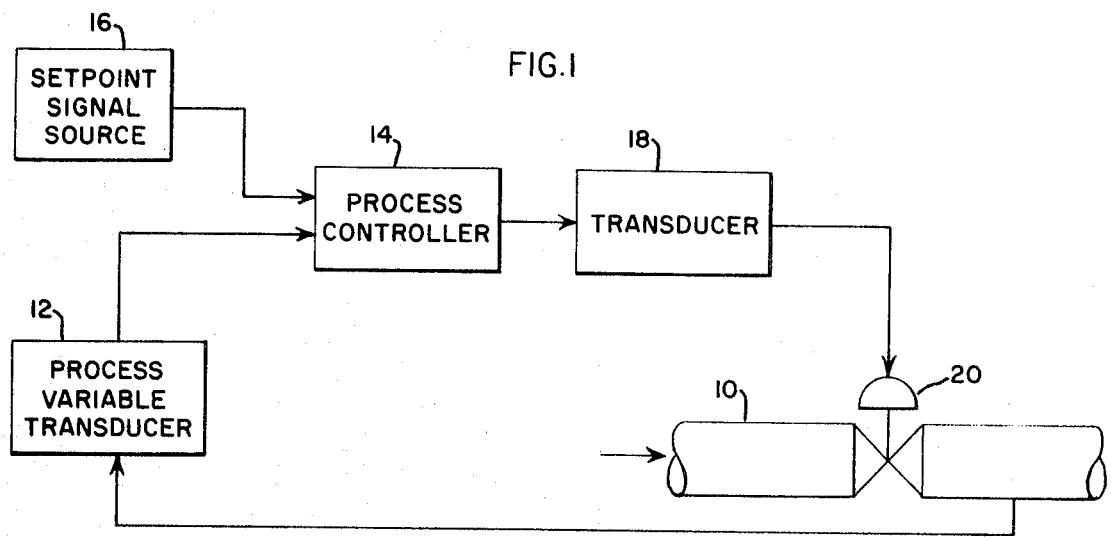
FIG. 1 is a block diagram of a closed-loop process control system including a process controller into which the present invention may be incorporated.

Referring to FIG. 1, a closed-loop process control system is used to regulate the discharge pressure in a pipeline 10. The discharge pressure is monitored by a pressure or process variable transducer 12 which generates an electrical signal proportional to the instantaneous value of the discharge pressure. This signal is applied to a process controller 14 along with a setpoint signal from a setpoint signal source 16. In accordance with the present invention, the signal provided by the process controller 14 will include a component determined by the derivative or rate of change of the process variable. Depending upon the characteristics of the process in which the pipeline 10 is connected, the signal generated by the process controller 14 may also include proportional and reset contributions established by the magnitude and the integral of the deviation between the process variable signal and the setpoint signal. The process controller signal is applied to a transducer 18 which includes a servomechanism for controlling the setting of a valve 20 in the pipeline 10. If the discharge pressure in the pipeline 10 increases or decreases beyond a desired value as represented by the setpoint signal, the closed loop alters the setting of the valve 20 to decrease or increase the flow of fluid through the pipeline 10 so as to counteract the original change in pressure.

Figure 2:
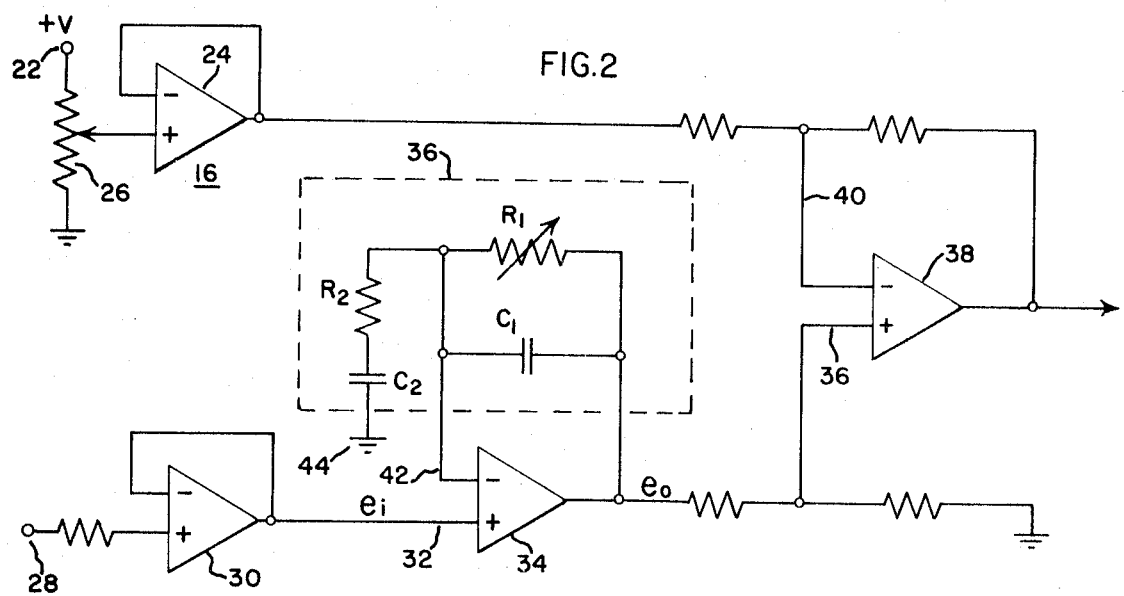
FIG. 2 is a schematic diagram showing certain details of a process controller constructed in accordance with the present invention.

It has been mentioned that the output of the process controller 14 includes a signal component due to the effect of rate action on the process variable signal only. The circuit used to develop this rate action in process controller 14 is shown in detail in FIG. 2. That figure shows the setpoint signal source 16 to be a positive voltage source 22 coupled to one input of a high-impedance follower amplifier 24 though a potentiometer 26. The output of the process variable transducer 12 is applied to an input terminal 28 of a high-impedance follower amplifier 30.

When a change occurs in the monitored process or, more specifically, in the discharge pressure, the changing signal at the output of the amplifier 30 is applied to a first input 32 of a high-input-impedance differential amplifier 34, hereafter referred to as the first differential amplifier. A rate circuit 36 provides a transfer function which introduces a rate component in the output signal of amplifier 34. The amplifier output signal including the rate component is applied to a first input 36 of a second differential amplifier 38. A second input 40 to the second differential amplifier 38 is provided by the setpoint signal source 16. The second differential amplifier 38 is a unity gain amplifier which combines the setpoint signal with the process variable signal including the rate component and provides an output signal which may be applied to additional amplifiers or directly to the transducer 18. In most applications, the signal at the output of the second differential amplifier 38 is further modified by proportional band and reset circuits. Since the particular form of the proportional band and the reset circuits or even their existence is not essential to an understanding of the present invention, they are not disclosed.

The rate circuit 36 mentioned above includes a first capacitor $C_1$ connected in parallel with a first, preferably adjustable, resistor $R_1$ between the output terminal of amplifier 34 and a second input terminal 42 of that amplifier. The rate circuit 36 further includes a second resistor $R_2$ connected in series with a second capacitor $C_2$ between the input terminal 42 and an electrical ground 44.

While the precise values for the resistors and capacitors in rate circuit 36 depend on the rate gain (signal amplification) and the rate time (signal duration) which are to be established, the effects of resistor $R_2$ on the transfer function are ignored in the following analysis. Resistor $R_2$ has a low ohmic value relative to resistor $R_1$ and is included only to damp any high-frequency oscillations which might occur at the output of amplifier 34.

Using well-known circuit analysis techniques, it can be shown that the transfer function ($e_o/e_i$) of amplifier 34 is approximately equal to (1) $\quad 1+[R_1C_2S/1+R_1C_1S]$ where $S$ is the universally accepted symbol for the LaPlace operator. By conventional algebraic manipulation, equation (1) can be converted to the form (2) $\quad (1/1+R_1C_1S)+(R_1C_1S+R_1C_2S/1+R_1C_1S)$ Because $R_1$ is relatively large, the quantity $R_1C_1S$ is large with respect to the numeric 1. Therefore, as an approximation, the quantity $1+R_1C_1S$ may be replaced by the quantity $R_1C_1S$. Consequently, the first term of equation (2) approaches zero and is dropped. The second term of equation (2) assumes the form (3) $\quad 1+C_2S/C_1S$ which represents the rate gain of the transfer function. To illustrate, assume that $C_2$ equals 10 microfarads and $C_1$ equals 1 microfarad. If a change $ei$ occurs in a step in the process variable signal applied to terminal 32 of amplifier 34, the signal $e_o$ at the output terminal will attain a peak magnitude of [1+(10/1)]a$E_t$ OR AA$E_t$ BEFORE BEGINNING TO DECAY)

The rate of decay of signal $e_o$ is, of course, a function of the magnitudes of elements $R_1C_1$, and $C_2$. The time constant of any resistor-capacitor circuit determines the rate of decay of signals generated in that circuit. For the rate circuit 36, the time constant is $R_1(C_1+C_2)$.

While there has been described what is thought to be a preferred embodiment of the present invention variations and modifications will occur to those skilled in the art once they become familiar with the described embodiment of the invention. Therefore, it is intended that the appended claims shall be construed to include all such variations and modifications as fall within the true spirit and scope of the invention.

I claim:

1. For use in a process control system having process variable and setpoint signal sources, a process controller comprising:
   a. a first differential amplifier having a first input terminal adapted to be connected to the process variable signal source, a second input terminal, and an output terminal;
   b. a rate circuit in a feedback loop connecting output terminal and the second input terminal of said first differential amplifier; and
   c. a second differential amplifier having a first input terminal connected to the output terminal of said first differential amplifier, a second input terminal adapted to be connected to the setpoint signal source, and an output terminal, the signal on said last-mentioned output terminal being characterized by the application of rate action to changes in only the process variable signal.

2. A process controller as recited in claim 1 wherein said rate circuit includes:
   a. a first resistor and a first capacitor connected in parallel in the feedback loop; and
   b. a second capacitor connected between a ground terminal and the second input terminal.

3. For use in a process control system having process variable and setpoint signal sources, a process controller comprising:
   a. a first amplifier having an input terminal adapted to be connected to the process variable signal source, and an output terminal;
   b. a rate circuit in a negative feedback loop for said first amplifier; and
   c. signal-combining means having a first input terminal connected to the output terminal of said first differential amplifier, a second input terminal adapted to be connected to the setpoint signal source, and an output terminal, the signal on said fast-mentioned terminal being characterized by the application of rate action to changes in only the process variable signal.

4. A process controller as recited in claim 3 wherein said signal-combining means comprises a differential amplifier.

5. A process controller as recited in claim 3 wherein said rate circuit includes a first resistor and first capacitor connected in parallel in the negative feedback loop and a second capacitor connected between one end of the parallel connection and an electrical ground.

* * * * *

UNITED STATES PATENT OFFICE
CERTIFICATE OF CORRECTION

Patent No. 3,628,129          Dated December 14, 1971

Inventor(s) John E. Riley

It is certified that error appears in the above-identified patent and that said Letters Patent are hereby corrected as shown below:

Column 1, line 15, after "signals", insert -- are applied to process controllers along with setpoint signals --; line 21, "value" should be -- valve --; line 25, "the" (first occurrence) should be -- that --. Column 3, line 34, "$aE_1$ OR $\wedge\wedge E_1$" should be -- $e_1$ or $11e_1$ --. Column 4, line 36, (claim 3), "fast" should be -- last --.

Signed and sealed this 6th day of June 1972.

(SEAL)
Attest:

EDWARD M. FLETCHER, JR.          ROBERT GOTTSCHALK
Attesting Officer          Commissioner of Patents